United States Patent
Sassmannshausen

[19]

[11] Patent Number: 5,803,642
[45] Date of Patent: Sep. 8, 1998

[54] ADJUSTING DEVICE ON LENGTH—AND INCLINATION ADJUSTABLE SUPPORTS, IN PARTICULAR FOR PERCUSSION MUSICAL INSTRUMENTS

[75] Inventor: Werner Sassmannshausen, Bad Berleburg, Germany

[73] Assignee: Sonor Johns Link GmbH, Berleburg, Germany

[21] Appl. No.: 717,146

[22] Filed: Sep. 20, 1996

Related U.S. Application Data

[63] Continuation of Ser. No. 134,223, Oct. 8, 1993, abandoned.

[30] Foreign Application Priority Data

Oct. 9, 1992 [DE] Germany .......................... 42 34 001.2

[51] Int. Cl.$^6$ ....................................................... F16D 1/12
[52] U.S. Cl. ......................... 403/90; 84/327; 248/124.1; 248/181.1; 248/288.31; 403/76; 403/122; 403/128; 403/129; 403/141
[58] Field of Search .................. 84/327, 421; 248/124.1, 248/181.1, 278.1, 288.31, 481; 403/76, 90, 114, 122, 128, 129, 130, 131, 141, 143, 144

[56] References Cited

U.S. PATENT DOCUMENTS

| 259,957 | 6/1882 | White | 403/130 X |
|---|---|---|---|
| 352,025 | 11/1886 | Zanetti | 248/288.3 X |
| 438,238 | 10/1890 | Jeffries et al. | 403/131 |
| 566,361 | 8/1896 | White | 403/131 |
| 1,169,901 | 2/1916 | Wittemann et al. | 464/152 |
| 2,652,221 | 9/1953 | Kampa | 403/131 X |
| 3,191,484 | 6/1965 | Walling | 84/421 |
| 3,211,405 | 10/1965 | Fey et al. | 248/181 X |
| 3,405,587 | 10/1968 | Meazzi et al. | 84/421 |
| 3,704,645 | 12/1972 | Granso et al. | 403/90 X |
| 3,989,321 | 11/1976 | McCloskey | 403/129 X |
| 4,158,981 | 6/1979 | Kurosaki | 84/421 |
| 4,453,446 | 6/1984 | Hoshino | 84/421 |
| 4,796,508 | 1/1989 | Hoshino | 84/421 |
| 4,917,527 | 4/1990 | Bollinger | 403/90 |
| 5,393,161 | 2/1995 | Mata et al. | 403/141 X |
| 5,645,253 | 7/1997 | Hoshino | 248/181.1 |

FOREIGN PATENT DOCUMENTS

| 1762727 | 1/1958 | Germany . |
|---|---|---|
| 1766272 | 2/1958 | Germany . |
| 1950381 | 11/1966 | Germany . |
| 2307826 | 2/1973 | Germany . |
| 7806168 | 3/1978 | Germany . |
| 3134910 | 9/1981 | Germany . |

Primary Examiner—Anthony Knight
Assistant Examiner—Andrea Chop
Attorney, Agent, or Firm—Anderson, Kill & Olick, P.C.

[57] ABSTRACT

A device for adjusting a length or inclination of a support for a percussion musical instrument, including an articulated ball formed of a plurality of sector members forming a central channel for receiving an adjusting rod-shaped member, clamping jaws having inner surfaces defining a socket for retaining the articulated ball and forming therewith a ball-and-socket joint, and a tensioning element for actuating the clamping jaws.

11 Claims, 8 Drawing Sheets

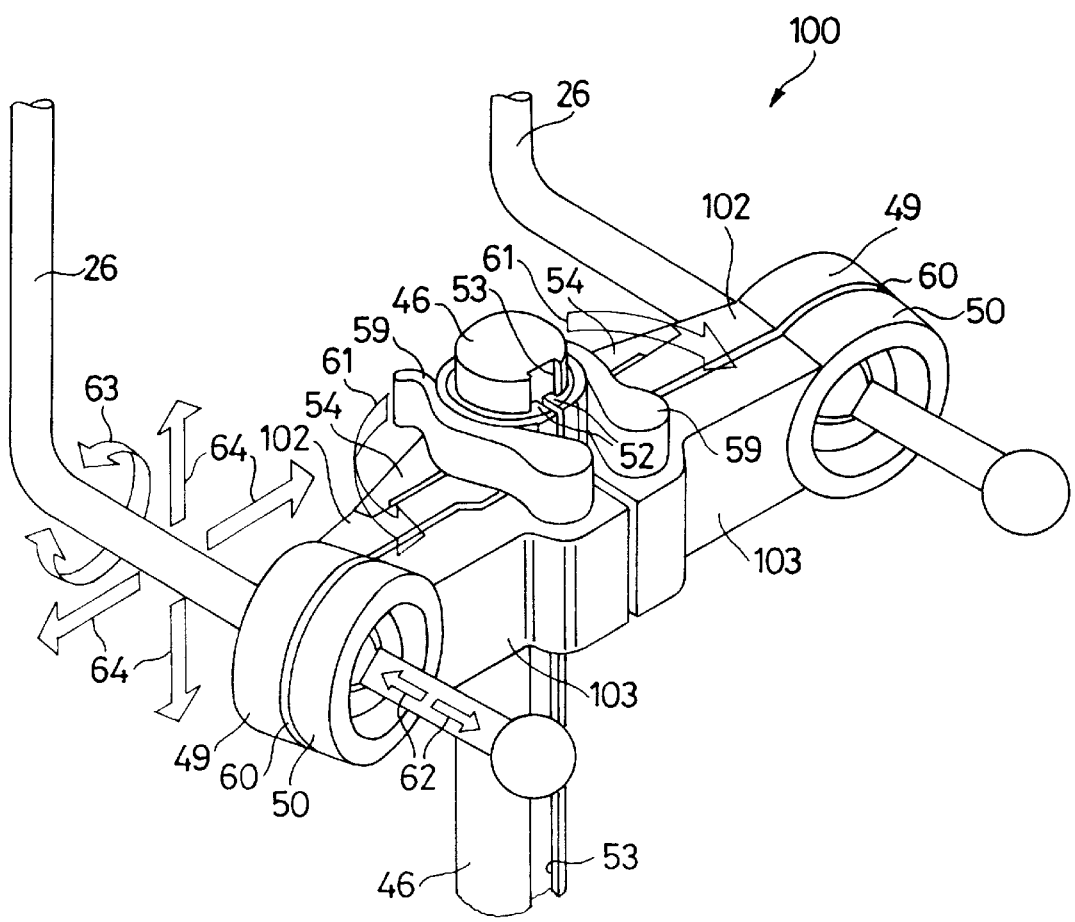

ADJUSTING DEVICE ON LENGTH— AND INCLINATION ADJUSTABLE SUPPORTS, IN PARTICULAR FOR PERCUSSION MUSICAL INSTRUMENTS

This is a continuation of application Ser. No. 08/134,223 filed Oct. 8, 1993, now abandoned.

BACKGROUND OF THE INVENTION

The invention relates to an adjusting device on length- and inclination adjustable supports, in particular for percussion musical instruments having a ball-and-socket joint, which is seated between clamping jaws, which can be operated by tensioning members and which contain openings for rods, arms or the like connected to the articulated ball.

Such an adjusting device belongs to the prior art and is disclosed, for example by German Patent Specification 35 20 837.

In this case a first rod, arm or the like is connected to one of the clamping jaws between them housing the articulated ball, while another rod, arm or the like is also securely connected to the articulated ball.

By means of the articulated ball and the clamping jaws cooperating therewith, the inclined position of the two rods, arms or similar can within certain limits be altered in a continuously variable manner and on all sides.

A disadvantage of the known adjusting device lies in that to enable alterations in length of the rods, arms or the like relative to the ball-and-socket joint it is still necessary to form them from sections which are telescopically seated in one another and to associate them with other clamping devices, which then have to be provided with a more or less large spacing from the actual ball-and-socket joint.

Length- and inclination-adjustable supports of this type, as are required in particular for percussion musical instruments, therefore have a relatively complicated and thus expensive design.

The object of the invention is to create a generic adjusting device, which with simple means permits the construction of length- and inclination-adjustable supports, in particular for percussion musical instruments, in which the longitudinal adjustment of the rods, arms or the like can be performed in the region of the ball-and-socket joint enabling the adjustment of their mutual inclination.

SUMMARY OF THE INVENTION

The object of the invention is in principle achieved in that the articulated ball consists of several sector members, which are exclusively held together by ball sockets in the clamping jaws and together enclose a channel, passing through the ball centre, the wall faces of which form a clamp for the rod, arm or the like.

The joints between the adjacent sector members and therefore also the channel enclosed thereby has its cross section enlarged by loosening the tensioning members at the clamping jaws between them holding the articulated ball. As a result it is not only possible to alter the angular position of the rod, arm or the like housed in this channel, but it can also be displaced inside the channel in its longitudinal direction and, as a result, its effective length can be altered.

According to the invention it is advantageous if all sector members of the articulated ball have a matching shape.

However in many cases it may be expedient if, for an adjusting device according to the invention, several groups of different sector members together form the articulated ball.

In all cases however the correct function of the adjusting device should be assisted by the fact that expansion elements, e.g. springs, are mounted between the separating planes of adjacent sector members of the articulated ball.

Within the scope of the invention it is possible to house the rod, arm or the like in the channel of the articulated ball selectively in a longitudinally displaceable and fixable manner. However it may also be selectively only housed in the channel in a rotational and fixable manner.

However a design in which the rod, arm or similar is housed in the channel of the articulated ball both in a longitudinally displaceable manner and also a rotatable and fixable manner has proved to be particularly advisable.

For practical use adjusting devices in which the articulated balls consist of two-eight sector members have proved to be expedient.

The rod, arm or similar may in accordance with the invention comprise a rotationally symmetrical or polygonal cross section, whereby the channel of the articulated ball is equipped with a cross section which is adapted thereto, or is at least similar.

Regular cross sections having three to eight corners may advantageously be used as the polygonal cross section of the rod, arm or similar. However it is also possible to provide a rectangular cross section as the polygonal cross section of the rod, arm or similar. In the latter case there are in turn two possible measures for further developments. The joints between adjacent section members of the articulated ball can either extend parallel to the wide sides of the cross-sectional faces and narrow sides of the cross-sectional faces of the rectangular cross section of the rod, arm or similar, or it is possible to allow these joints to extend in the direction of the diagonals of the faces of the rectangular cross section of the rod arm or the like.

For an optimal operation of an adjusting device according to the invention, it is also still important to connect two clamping jaws by at least one articulation, the axis of which extends at right angles to the effective direction of the tensioning members, and which is associated with the ends of the clamping jaws remote from the tensioning members.

On the other hand it is not out of the question to connect two clamping jaws by at least two, but preferably three, tensioning members.

With the provision of three tensioning members it may prove to be expedient that two of them at the same time also form the articulation between the two clamping jaws and that the axes of both articulation align with one another, and are preferably formed by a mutual hinge pin.

In each case two of three tensioning members should only form secondary adjustment tensioning members, whereas only the third tensioning member is provided as a main tensioning member—having an operating toggle. This embodiment firstly makes it possible to adjust optimally (parallel) the spacing between the two clamping jaws of the adjusting device acting on the articulated ball. Secondly however there is the advantage that only a single tensioning member ever has to be actuated—via its operating lever—to produce and remove the clamping action.

In accordance with the invention it has proved to be expedient to provide each tensioning member with screw adjustment means, because not only can these be easily manufactured and kept available, but also permits a continuously adjustable application of the clamping force between the clamping jaws and the articulated ball.

In accordance with the invention it has proved expedient if the articulated ball consists of at least three, but preferably of four, sector members and the channel inside them has a polygonal, in particular a square, cross section.

A feature for the further development of the adjusting device according to the invention also lies in that the clamping jaws are connected at one end by brackets directed at right angles thereto via hinge pins, while the tensioning members act on their other end.

To form the tensioning members can be used a bolt passing through the two clamping jaws, which at its free end has a thread for a nut, whereby this nut can be provided with an operating toggle, which is connected thereto by a coupling which can be disengaged at least sometimes.

The openings in the clamping jaws may in accordance with the invention be provided with funnel-shaped enlargements on their outer side, so that the rod, arm or the like passing through the articulated ball receives the largest possible region of adjustment for the angle of inclination.

Finally the fact that expansion springs are inserted firstly between the joints of the sector members forming the articulated ball and secondly between clamping jaws containing the ball sockets in order to effect an automatic opening of the adjusting device when loosening the tensioning members is of functional significance for an adjustment device according to the invention.

A refinement of the invention specifies that the clamping jaws can be adjusted by the action of eccentrics. Thus the joints between the adjacent sector members can simply be enlarged or reduced and consequently a rod, arm or similar disposed in the channel passing through the centre of the articulated ball can be released or clamped.

It is therefore suggested that an eccentric bolt provided with a swivelling lever is advantageously disposed in one clamping jaw at the end remote from the articulated ball and the other clamping jaw is acted on by the eccentric bolt. Consequently only the swivelling lever needs to be grasped and swivelled in the releasing or clamping direction, whereupon the sector members with the articulated ball are tensioned or released.

If the clamping jaws are preferably connected to one another by at least one threaded bolt adjacent to the articulated ball and disposed in front of it and the inner clamping jaw with respect to a supporting column is engaged in the supporting column, on the one hand a support for the clamping jaws holding together the articulated ball is produced at a central column, as in particular in percussion instruments. On the other hand the threaded bolt(s) disposed distant from the swivel lever in a region between the eccentric bolt and the articulated ball represents a thrust bearing required for the eccentric operation.

According to a refinement of the invention, a supporting member which can be engaged into the supporting column from the opposite side is connected with the inner clamping jaw. The supporting member screwed into the inner clamping jaw with at least one threaded bolt ensures a secure support of the eccentrically operated clamping jaw arrangement at the central supporting column; by tightening the threaded bolt(s) passing through the supporting member and screwing them into the inner clamping jaw, the locking engagement and thus the clamping jaw arrangement at the central supporting column is fixed in the desired position.

BRIEF DESCRIPTION OF THE DRAWINGS

The subject matter of the invention is explained below by means of an exemplified embodiment represented in the drawings, wherein:

FIG. 7 shows a plan view of FIG. 6, while FIG. 33 shows the adjusting device according to FIG. 32 in plan view and FIG. 34 shows a perspective view of the adjusting device comprising eccentrically operated pairs of clamping jaws, as shown in FIGS. 32 and 33.

DETAILED DESCRIPTION OF THE PREFERRED EMBODIMENTS

Figure 1:
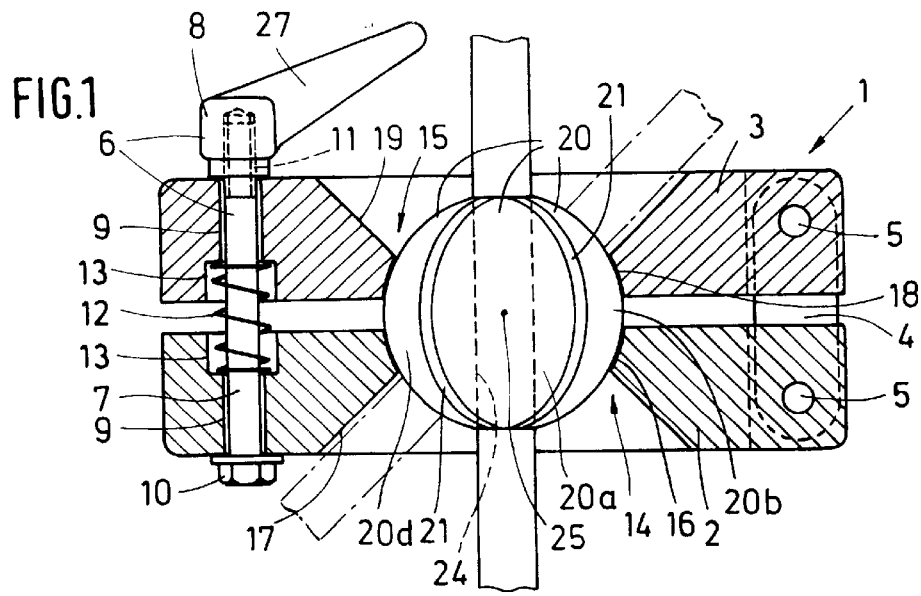
FIG. 1 shows an adjusting device for length- and inclination-adjustable supports of percussion musical instruments in longitudinal section.
Figure 2:
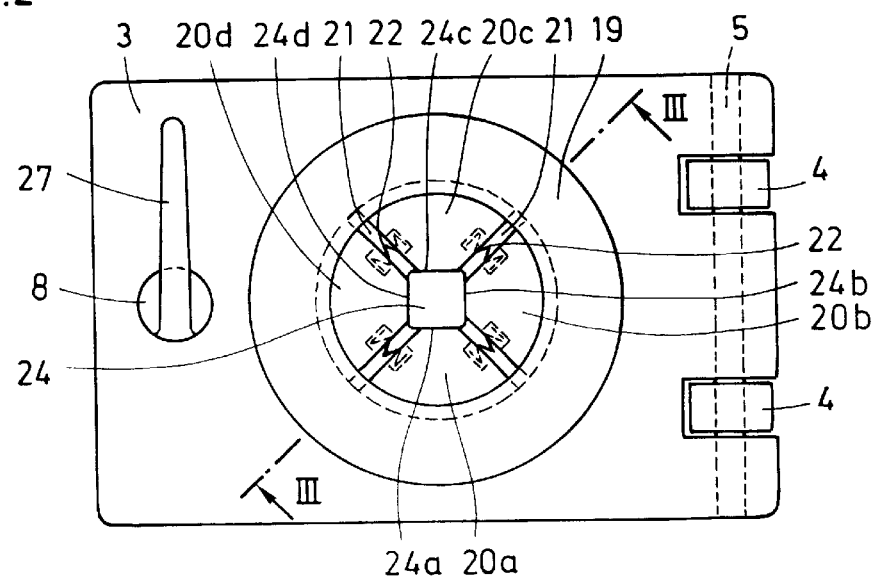
FIG. 2 shows the adjusting device shown in FIG. 1 in plan view.
Figure 3:
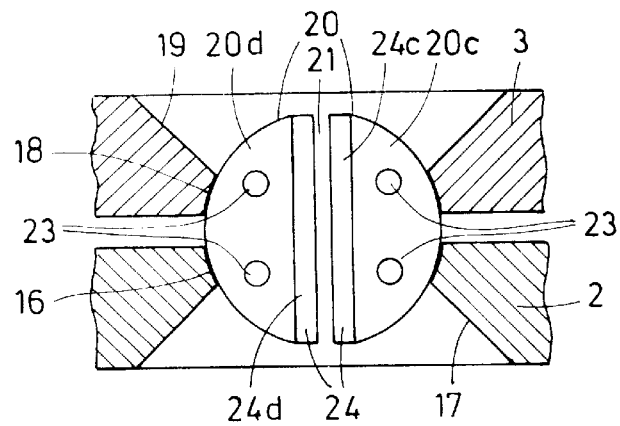
FIG. 3 shows a section along line III—III in FIG. 2.

In FIGS. 1 to 3 of the drawings can be seen a first exemplified embodiment of an adjusting device 1, as can be used in connection with length- and inclination-adjustable supports for percussion musical instruments. In this case the adjusting device 1 can be associated with the percussion musical instruments in various ways. It can, for example, be mounted on the upper end of the column of a stand, as can be used for supporting cymbals, tom-toms or like. However it is also possible to mount the adjusting device 1 on the kettle wall of a large drum if it is necessary to position further percussion musical instruments in a easy-to-use manner in its direct vicinity.

The adjusting device 1 uses two clamping jaws 2 and 3, one of which, for example clamping jaw 2, is used as an attachment and retention element and consequently can be connected to any support. Clamping jaw 3 is connected to clamping jaw 2 via brackets 4 directed tranversely thereto, and in fact by two hinge pins 5, which extend parallel to one another and also parallel to the main plane of the two jaws 2 and 3. The brackets 4 and the hinge pins 5 are mounted at one end of the jaws 2 and 3 and form a double articulation therewith. Tensioning members 6, which are formed by a tensioning bolt 7 and a tensioning nut 8, cooperate with the other ends of the two jaws 2 and 3. The tensioning bolt 7 passes though a cross hole 9 in the two clamping jaws 2 and 3. One end of the tensioning bolt 7 is supported with a head 10 axially against the outer face of the clamping jaw 2, while the other end thereof protrudes with a threaded section 11 over the outer face of clamping jaw 3 and also cooperates with the tensioning nut 8, which is supported against the outer face of the clamping jaw 3. Between the two clamping jaws 2 and 3 is provided a spring element, e.g. a helical compression spring 12. This is used permanently to expand the two clamping jaws with prestressing. The arrangement of the helical compression spring 12 can be seen from FIG. 1. There it can be seen that the helical compression spring 12 is placed on the tensioning bolt 7 and that its ends engage in bore enlargements 13, which are constructed on the inside of the clamping jaws 2 and 3 in alignment with the cross holes 9.

From FIG. 1 of the drawings it can also be seen that clamping jaw 2 is equipped in its central region with an opening 14 and clamping jaw 3 is equipped with a corresponding opening 15, and that openings 14 and 15 have a substantially mirror-image arrangement.

The opening 14 in clamping jaw 2 is on the one hand equipped with a ball socket 16 extending to the inner side, while it forms a funnel-shaped enlargement 17 towards the outer side. A corresponding ball socket 18 is also located on the inside of the opening 15 of the clamping jaw 3, while a conical enlargement 19 is connected thereto towards the outside.

Between the two clamping jaws 2 and 3 of the adjusting device, and in fact in the ball sockets 16 and 18 thereof, is housed an articulated ball 20, which consists of several sector members, for example four sector members 20a, 20b, 20c, 20d, which have a matching construction and shape.

Between the faces of adjacent sector members which are turned towards one another are provided separating planes 21, as can be seen particularly clearly from FIG. 2. In every separating plane 21 between adjacent sector members 20a, 20b, 20c and 20d are inserted compression springs 22, which try to expand the articulated ball and are fixed in pocket holes 23, which as shown in FIG. 3 are located in lateral faces, turned towards one another, of each individual sector member 20a to 20d of the articulated ball 20.

The sector members 20a to 20d of the articulated ball 20 together enclose a straight channel 24 passing through the ball centre 25, the cross-sectional shape of which is determined by the wall faces 24a, 24b, 24c and 24d, which are formed by the inwardly directed wall faces of each individual sector member 20a to 20d.

In the exemplified embodiment shown, these wall faces 24a to 24d of the sector members 20a to 20d are designed so they are plane and are disposed so that they enclose a channel 24 having a square cross section of passage. Wall faces 24a to 24d therefore extend with an obtuse angle of 135° to the side faces of each individual sector member 20a to 20d, each face of which is turned towards a separating plane.

A rod or arm 26 can be axially inserted into channel 24 in the articulated ball 20. This rod or arm 26 may obtain a cross-sectional shape corresponding to that of the channel 24. In the case of the exemplified embodiment, the rod or arm 26 would therefore have a square cross section corresponding to the channel 24. It is also possible to insert a rod or arm 26 having a round cross section into the channel 24, which has a square cross section.

By tightening the tensioning member 6 the two clamping jaws 2 and 3 can be mutually braced around the double articulations formed by the brackets 4 and the hinge pins 5 by overcoming the restoring force of the helical compression spring 12. As a result their ball sockets 16 and 18 act on the periphery of the articulated ball 20. The result of this is that by the narrowing of their separating planes 21 against the expanding action of the compression springs 22, sector members 20a to 20d forming the articulated ball 20 are displaced towards the longitudinal axis of the channel 24. At the same time the wall faces 24a to 24d of sector members 20a to 20b press radially inwards with the production of a clamping force against the peripheral faces of the rod or arm 26 and as a result secure it inside the articulated ball with great clamping force.

In the relaxed state of the tensioning members it is not only possible to place the articulated ball 20 in a continuously adjustable manner into the very varying angular positions relative to the ball sockets 16 and 18 of the two clamping jaws, but it is also possible to displace the rod or arm 26 inside the channel 24 of the articulated ball 20 in a continuously adjustable manner in the longitudinal direction. The extent of the angular displacement for the articulated ball 20, through which the rod or arm 26 passes, relative to the clamping jaws 2 and 3 of the adjusting device 1 is only restricted by the shape of the funnel-shaped enlargements 17 and 19 in the outside of the clamping jaws 2 and 3.

By using only one adjusting device 1, not only the angular position of the rod or arm 26 cooperating with the articulated ball 20 can be continuously adjusted, but it is also possible to perform its continuously adjustable longitudinal displacement inside the articulated ball 20. Every adjusted position of the rod or arm 26 can be fixed by one and the same tensioning member 6, i.e. with particularly easy handling.

As has already been stated above, the tensioning member 6 of the adjusting device 1 are formed by a tensioning bolt 7 and a tensioning nut 8 acting on a threaded section 11 thereof. The tightening and slackening of the tensioning nut 8 on the threaded section 11 of the tensioning bolt 7 is performed via a toggle 27, which is actively connected to the tensioning nut 8.

Figure 4:
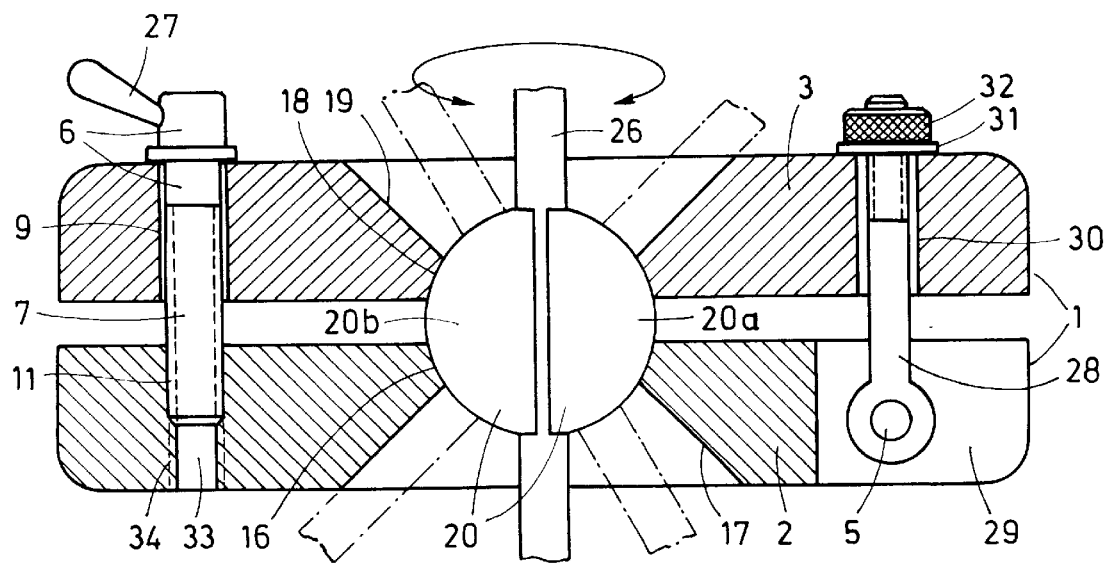
FIG. 4 shows a section along line IV—IV in FIG. 5 showing another design of an adjusting device.
Figure 5:
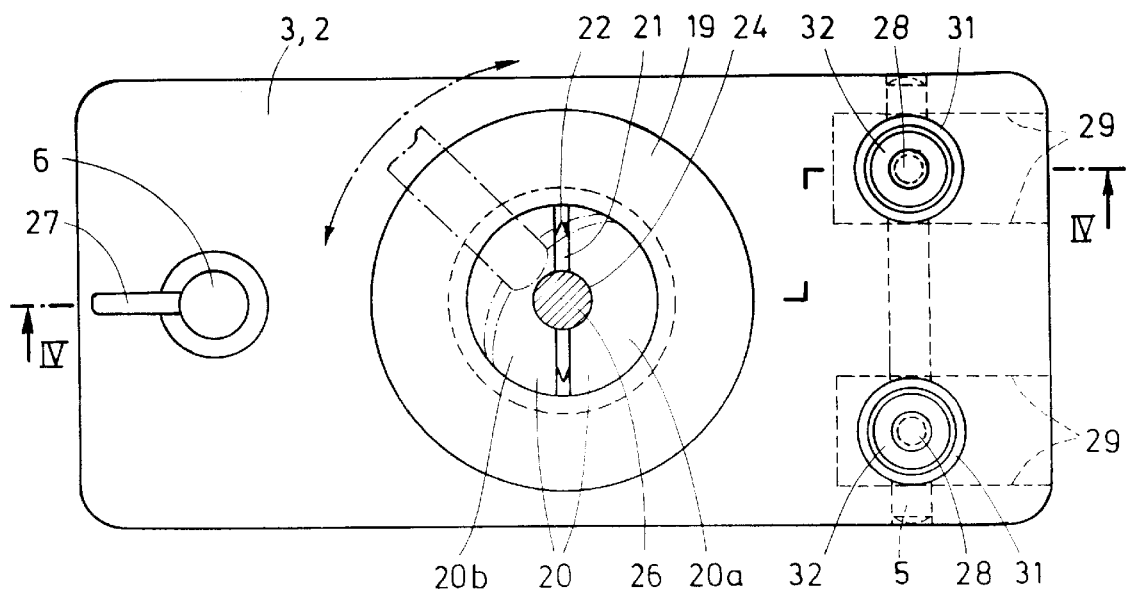
FIG. 5 shows a plan view of FIG. 4.

The further exemplified embodiment of an adjusting device 1 which can be seen in FIGS. 4 and 5 of the drawings basically has the same design as the adjusting device 1 shown in FIGS. 1 to 3. Therefore the same reference numbers are used in FIGS. 4 and 5 as in FIGS. 1 to 3.

However in contrast to the adjusting device 1 shown in FIGS. 1 to 3, two brackets 4 and two hinge pins 5 are not used for the articulated connection of the two clamping jaws 2 and 3. Instead only one hinge pin 5 is inserted into clamping jaw 2, whereby two ring and eye bolts 28 spaced next to one another, which with their shafts pass through a through hole 30 in clamping jaw 3, act on said pin inside a forked slot 29. A nut 32, preferably a knurled nut, is screwed onto the free end of the threaded shaft of the ring or eye bolt with the interposition of a plain washer 31. The distance between the two clamping jaws 2 and 3 can be adjusted if necessary by means of the ring or eye bolts 28 and the nut 32.

In contrast to the adjusting device 1 shown in FIGS. 1 to 3, with the adjusting device 1 shown in FIGS. 4 and 5 an articulated ball 20 is used which only consists of two hemispherical sector members 20a and 20b and consequently only has one diametral separating plane 21, in which the compression springs 22 are seated.

A further feature distinguishing the adjusting device 1 according to FIGS. 4 and 5 from that shown in FIGS. 1 to 3 also lies in that there is used a tensioning member 6 having a tensioning bolt 7 which is designed in one piece with the toggle 27 and that its threaded section 11 engages through the cross hole 9 of the clamping jaw 3 into a cross hole 33 of the clamping jaw 2, which is provided with an internal screw thread 34.

Because it is provided with the toggle 27, the tensioning member 6 permits in a simple manner a tightening and slackening of the two clamping jaws 2 and 3 with respect to the articulated ball 20 housed in its ball sockets 16 and 18.

A comparison of FIG. 2 with FIG. 5 clearly shows that in one case the rod or arm 26 retained and/or guided by the articulated ball 20 in its channel 24 has a square cross section, whereas in the other case it is used with a round cross section.

Figure 6:
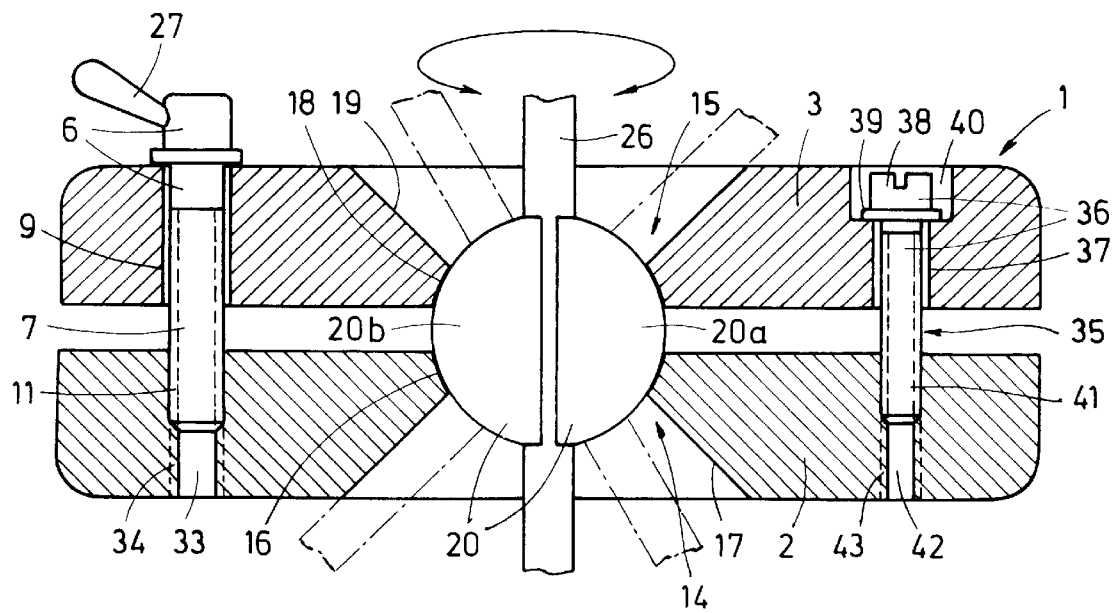
FIG. 6 shows a section along line VI—VI in FIG. 7 showing a further structural shape of an adjusting device.
Figure 7:
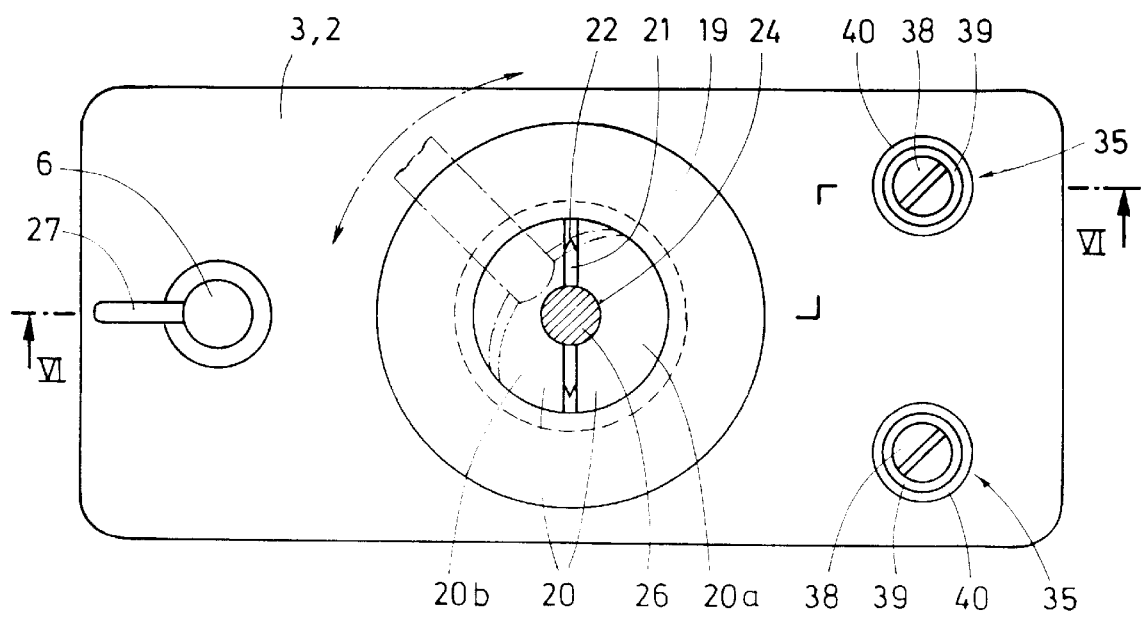

The design of the exemplified embodiment of an adjusting device 1 which can be seen in FIGS. 6 and 7 of the drawings in practice only differs from the exemplified embodiment shown in FIGS. 4 and 5 in that the connection between the two clamping jaws 2 and 3 is produced, instead of by two ring and eye bolts 28 and a hinge pin 5, by two additional tensioning members 35, each of which acts on the two clamping jaws 2 and 3 in a similar manner to tensioning member 6. Whereas tensioning member 6 acts in the vicinity on one end of the two clamping jaws 2 and 3 roughly over half the width of the jaws, the two tensioning members 35 are installed spaced from one another and symmetrically to the longitudinal centre of the clamping jaws in the vicinity of the other end of both clamping jaws, as FIG. 7 clearly shows. Every tensioning member 35 is formed by a cheese head screw 36, which passes through a through hole 37 in clamping jaw 3, while its head 38 is supported via a plain washer 39 in a stepped recess 40 of clamping jaw 3. The threaded shaft 41 of the cheese head screw 35 is brought into engagement with a through bore 42 of the clamping jaw 2, which contains an internal screw thread 43.

The tensioning members 35 are used for the same purpose as the ring and eye bolts 28 in the adjusting device 1 shown in FIGS. 4 and 5. With their help it should be possible to adjust the spacing between the two clamping jaws 2 and 3 of the adjusting device 1. A link joint 5 between the two clamping jaws 2 and 3 is however omitted in this case.

While the adjustment with the adjusting device 1 shown in FIGS. 4 and 4 can be performed directly by hand via the knurled nut 32, when the tensioning member 6 is loosened, in the exemplified embodiment shown in FIGS. 6 and 7 a screw driver may additionally be used for this purpose.

Figure 8:
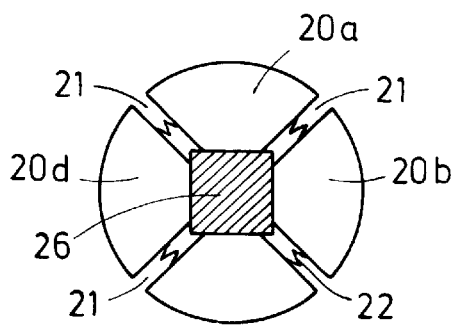
FIGS. 8 to 31 show certain details in partially sectional front view and in side view, i.e. the articulated ball and the rod or arm associated therewith, of the adjusting device represented in twelve different embodiments.
Figure 9:
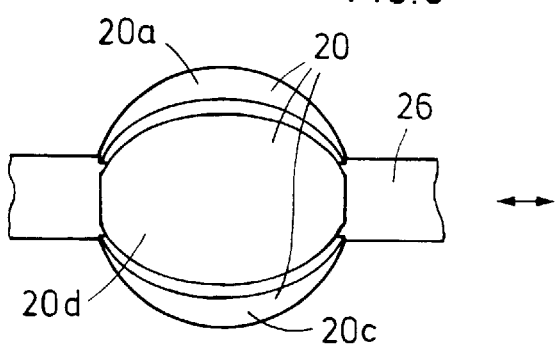

FIGS. 8 and 9 of the drawings show the articulated ball 20 and the rod or arm 26 or an adjusting device 1 with the structural shape as used in the exemplified embodiment of FIGS. 1 to 3. There four sector members 20a to 20d are in active connection with a rod or arm 26, which comprises a square cross-section. In this case all sector members 20a to 20d have a matching shape and are spaced by four separating planes 21, in which compression springs 22 are housed.

Figure 10:
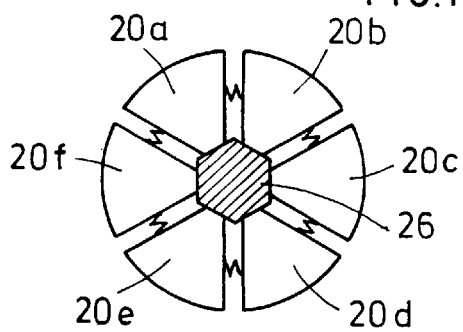
Figure 11:
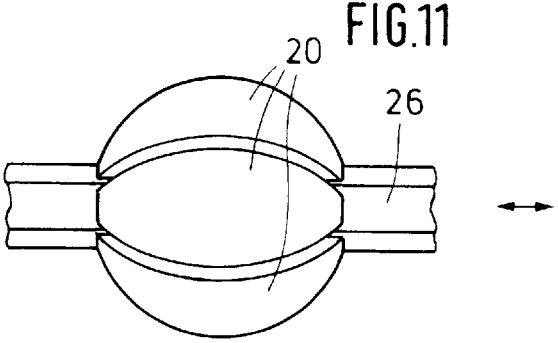

In FIGS. 10 and 11 is shown an articulated ball in active connection with a rod or arm 26. In this case the articulated ball consists of six sector members 20a to 20f having the same shape, which are spaced by a separating plane 21, in which compression springs 22 lie. The rod or arm 26 in this case also has a hexagonal cross section. This is also housed in a hexagonal channel 24 between the sector members 20a to 20f of the articulated ball 20.

Figure 12:
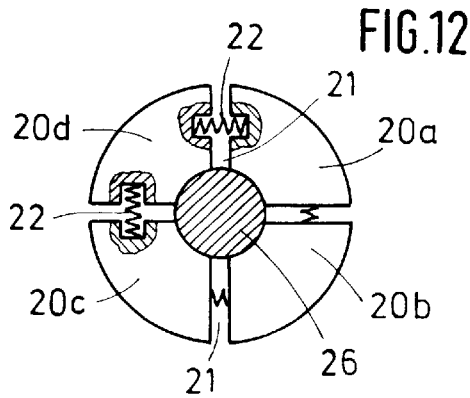
Figure 13:
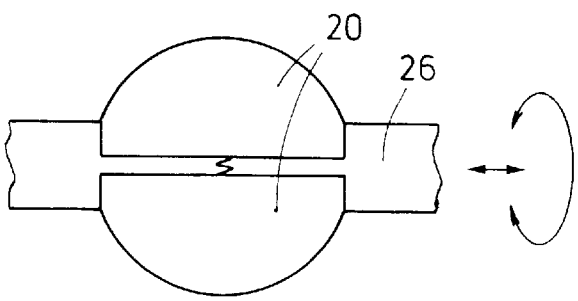
Figure 14:
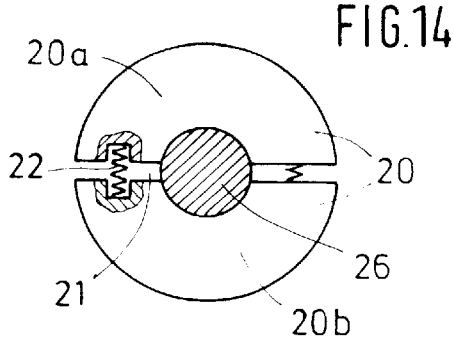
Figure 15:
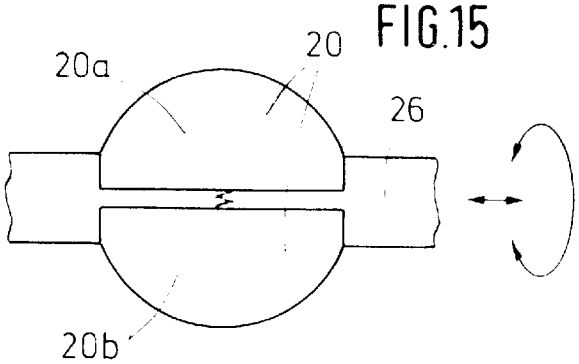

Whereas in FIGS. 14 and 15 can be seen an articulated ball 20 and a rod or arm 26 as is used in the exemplified embodiments of the adjusting device 1 shown in FIGS. 4 and 5 and also 6 and 7, FIGS. 12 and 13 instead show a design where the articulated ball 20 does not consist of two sector members 20 and 20b, but of four sector members 20a to 20d. In both cases however the rod or arm 26 has a round cross section and the channel 24 enclosed by the articulated ball 20 also has a substantially round cross section.

Figure 16:
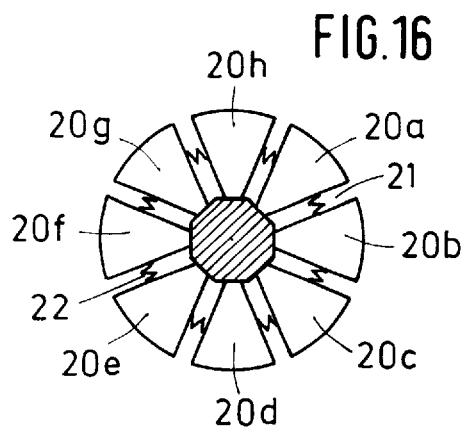
Figure 17:
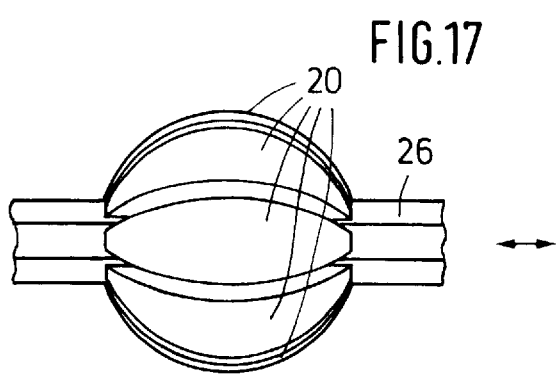

In FIGS. 16 and 17 of the drawings can be seen an articulated ball 20 and a rod or arm 26, which to a certain extend represent a further development of the design shown in FIGS. 10 and 11. In the latter case however the number of sector members 20a to 20b forming the articulated ball 20 is increased from six to eight and the cross section of the rod or arm 26 is also octagonal.

Figure 18:
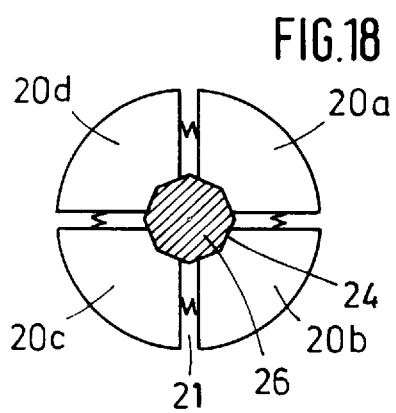
Figure 19:
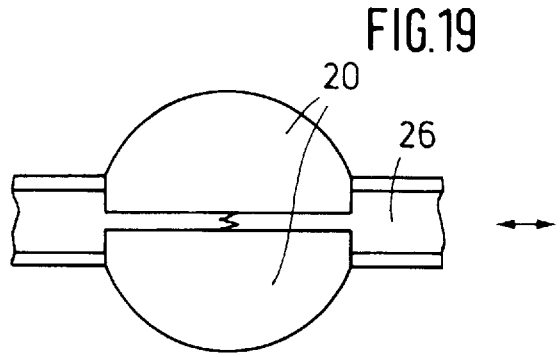

By FIGS. 18 and 19 it is made evident that there is the immediate possibility of allowing an articulated ball 20 consisting of four sector members 20a to 20d to come into effective contact with a rod or arm 26 having an octagonal cross-sectional shape. In this case just the faces of the individual sector members 20a to 20b bounding the channel 24 of the articulated ball 20 have to be given a slightly roof-shaped design.

Figure 20:
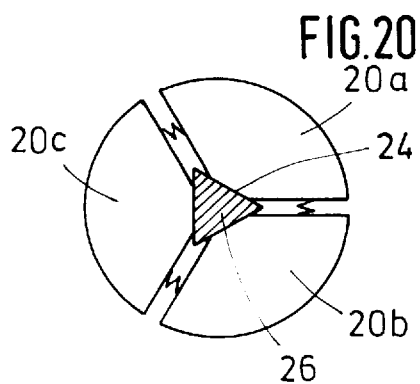
Figure 21:
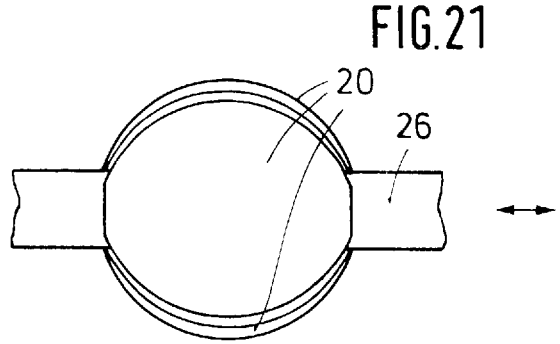

FIGS. 20 and 21 represent an articulated ball 20 which is composed of three sector members 20a to 20c and which via its channel 24 interacts with a rod or arm 26 having a triangular cross-sectional shape.

Further possible embodiments for articulated balls 20 and associated rods or arms 26 can be seen in FIGS. 22 to 27. In these cases the rods or arms 26 have a flat rectangular cross-sectional shape, as can clearly be seen from FIGS. 22, 24 and 26.

Figure 22:
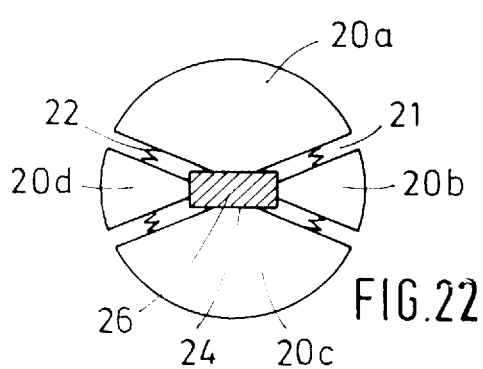
Figure 23:
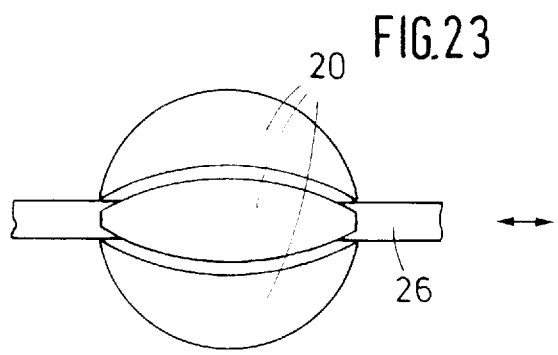

In the case of FIGS. 22 and 23 the articulated ball 20 is again composed of four sector members 20a to 20D. Sector members 20a, 20c and 20b, 20d are in this case designed differently in pairs. The larger part of the entire body of the articulated ball 20 is in this case formed by the two sector members 20a and 20c, while the two remaining sector members 20b and 20d only form the smaller part of the entire ball. The separating planes 21 between adjacent sector members 20a to 20d assume such a relative position that their central planes coincide with the plane diagonals to the cross section of the flat rectangular rod or arm 26 (FIG. 22).

Figure 24:
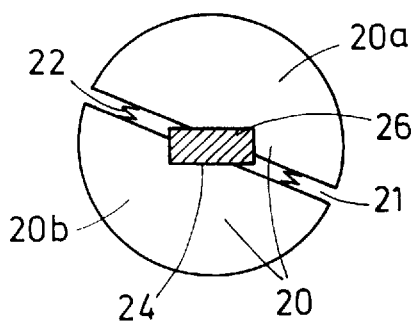
Figure 25:
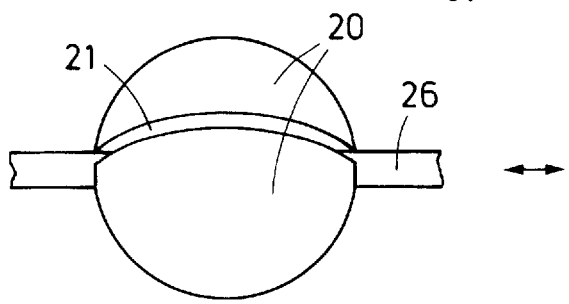

A refinement of the embodiment shown in FIGS. 22 and 23 can be seen in FIGS. 24 and 25. However here only two sector members 20a and 20b together form the articulated ball 20. The separating plane 21 between them in this case is positioned so that its longitudinal centre coincides with a plane diagonal to the flat rectangular cross section of the rod or arm 26 (FIG. 24). Notches in the form of right-angled triangles in the faces of the sector members 20a and 20b turned towards one another at the separating plane 21 here together enclose the rectangular cross section of the channel 24.

Figure 26:
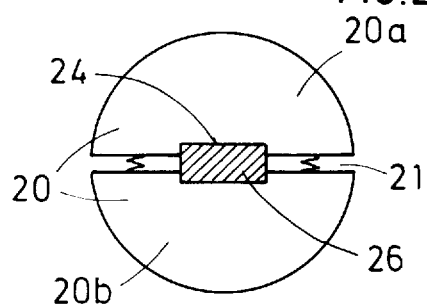
Figure 27:
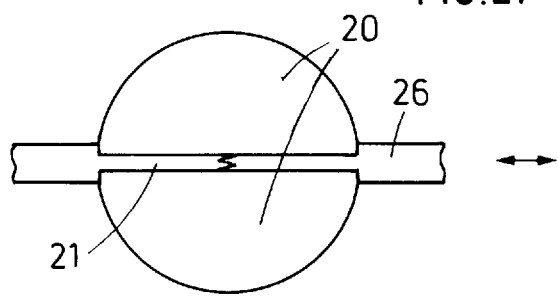

The exemplified embodiment shown in FIGS. 26 and 27 in practice differs from that in FIGS. 24 and 25 only by the fact that the separating plane 21 between the two sector members 20a and 20b of the articulated ball 20 extends parallel to the wide side of the rod or arm 26 having a flat rectangular cross section and by the fact that the flat rectangular channel 24 for housing the rod or arm 26 is determined by flat rectangular grooves cut into the faces of the sector members 20a and 20b turned towards one another (FIG. 26).

Figure 28:
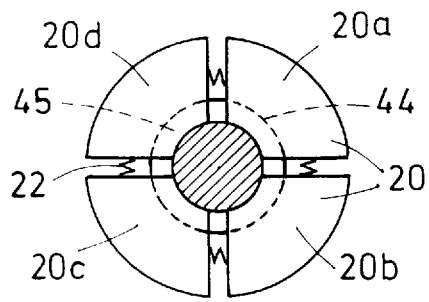
Figure 29:
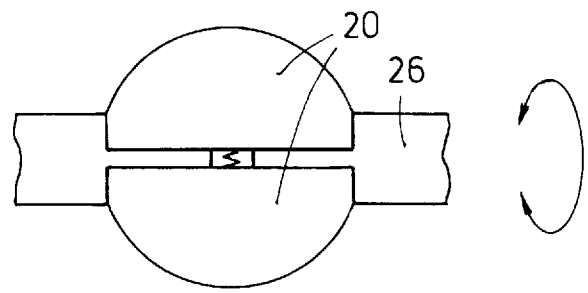
Figure 30:
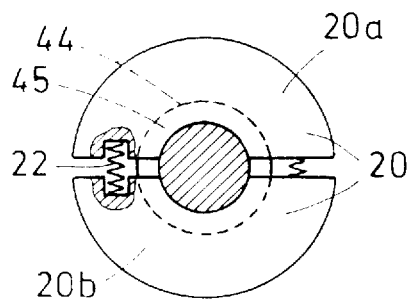
Figure 31:
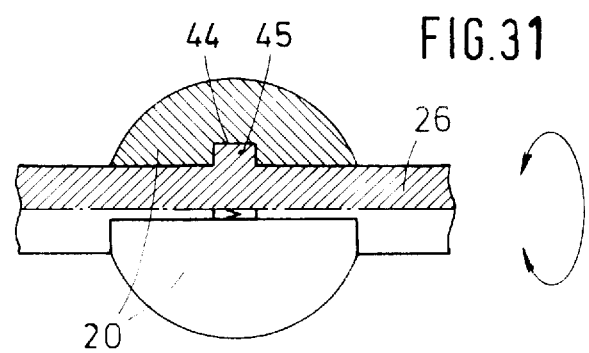

In FIGS. 28 and 29 can be seen a refinement of FIGS. 12 and 13 and in FIGS. 30 and 31 can be seen a refinement of FIGS. 14 and 15.

Whereas in the exemplified embodiments represented in FIGS. 12 to 15 there is the possibility of retaining and clamping the rods and bars 26 both in a rotationally adjustable and also in a length-adjustable manner in the channels 24 of the articulated balls 20, in FIGS. 28 to 31 it is necessary to provide an arrangement of the rod or arm 26 in the articulated ball 20 which in fact permits a rotationally adjustable clamping, but prevents a longitudinal adjustment. For this purpose it is only necessary to ensure an axial form-fit between the sector members 20a to 20d and 20a and 20b of the respective articulated ball 20 and the associated rod or arm 26, without impairing rotatability. The interaction of peripheral grooves 44 and peripheral ridges 45, which are on the one hand located in the sector members of the articulated ball 20 and on the other hand on the rod or arm 26, are useful for this purpose. As can be seen in particular from FIG. 31, in the exemplified embodiments shown the peripheral groove 44 is provided adjacent to the channel 24 in the sector members 20a and 20b or 20a to 20d, while the peripheral ridge 45 protrudes over the periphery of the rod or arm 26.

Of course it is obvious that a reverse arrangement can be provided, in which the peripheral ridge is therefore located inside the channel 24 enclosed by the sector members, while the peripheral groove is provided in the rod or arm 26.

Although with the exemplified embodiment shown in the drawings an adjusting device 1 was only explained in applications for length- and inclination-adjustable supports for percussion musical instruments, it is obvious that the adjusting device 1 is also suitable for other applications, in which a length- and inclination-adjustable support for any object is required.

Figure 32:
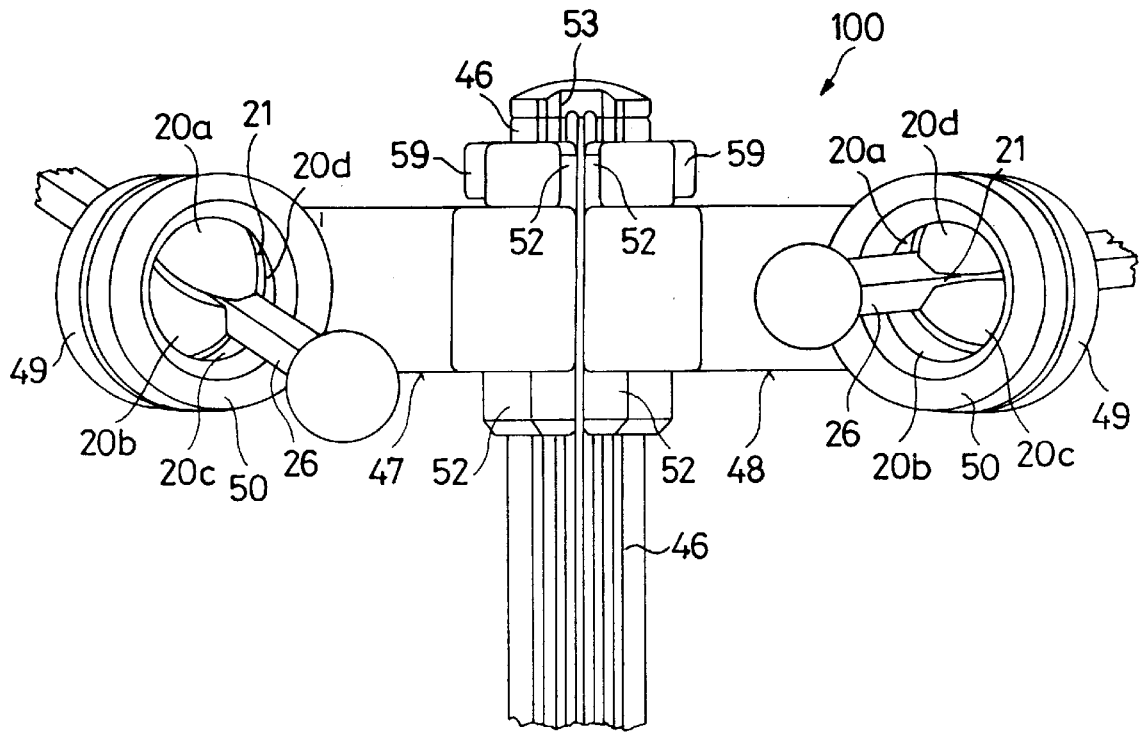
FIG. 32 shows an adjusting device attached in a symmetrical arrangement to a central supporting column, consisting of two clamping jaw units and provided with articulated balls for an arm, rod or similar from two clamping jaw units, shown in front view.
Figure 33:
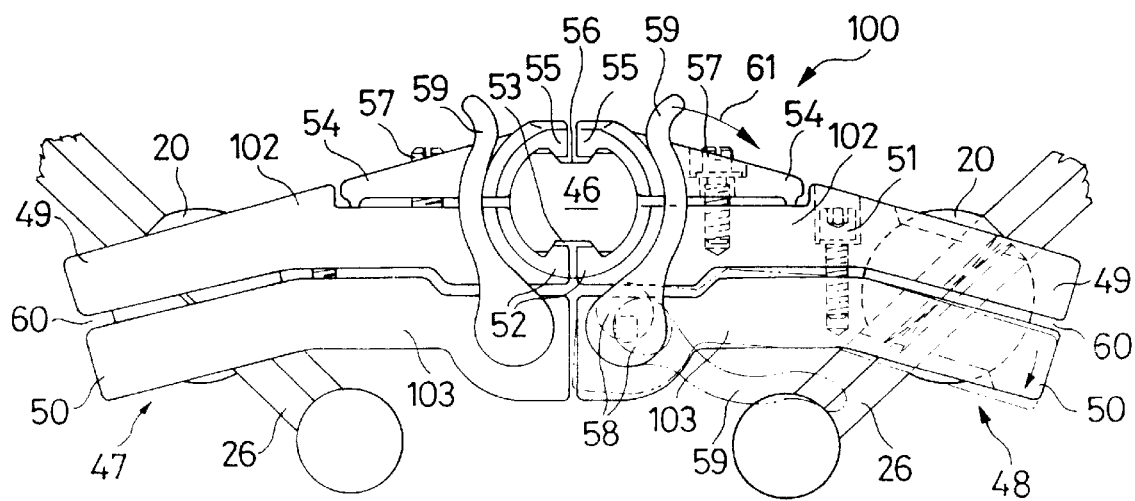

An adjusting device 100 disposed, as shown in FIGS. 32, on a central supporting column 46 comprises, in a symmetrical arrangement, two clamping jaw units 47 and 48 respectively, which consist of a first, inner clamping jaw 102—with respect to its position to the central supporting column 46—and an outer clamping jaw 103 (cf. also FIGS. 33 and 34). Each clamping jaw unit 47, 48 is provided with housings 49, 50, which have a substantially annular construction, at the free ends of their clamping jaws 102 and 103 (cf. FIGS. 32 and 34). The housings 49, 50 possess ball sockets 16, 19—which can not be seen in FIGS. 32 to 34 for graphical reasons, but are constructed similar to those in FIG. 6—in which are mounted the sector members 20a and 20d of the articulated ball 20 which support a rod, arm 26 or similar in a free channel.

The clamping jaws 102, 103 of each clamping jaw unit 47 and 48 respectively are connected to one another via threaded bolts 51, or alternatively, for example, by a hinge (not shown) and the inner clamping jaw 102 with respect to the supporting column 46 is engaged with a projection 52 in a longitudinal groove 53 (cf. also FIG. 34) or the central supporting column 46. So that the clamping jaw units 47, 48 can be securely fixed to the central supporting column 46, a supporting member 54 engages with a projection 55 in a longitudinal groove 56, disposed diametrally to the longitudinal groove 53, of the central supporting column 46 and is screwed via threaded bolt 57 to the inner clamping jaw 102 of a clamping jaw unit 47 or 48 respectively. By tightening the threaded bolt 57 the projections 52 of the inner clamping jaws 102 or the projections 55 of the supporting members 54 are fixed in the longitudinal grooves 53 or 56 of the central supporting column 46.

Swivelling levers 59, which are constructed with an eccentric bolt 58, are disposed in the respective outer clamping jaws 103, whereby their eccentric bolts 58 are inserted from the inside into the outer clamping jaws 103, so that the eccentric bolts 58 extend parallel to the central supporting column 46 (cf. FIGS. 33 and 34). As can be seen from the diagrammatical representation in FIG. 33, the eccentric bolts 58 bridge a gap 60 present between the inner and outer clamping jaw 102 and 103 respectively and consequently abut the face of the inner clamping jaws 102 close thereto with its outer periphery. The position of the arm, rod 26 or similar clamped between the sector members 20a to 20d in the articulated ball 20 is shown in FIG. 33; in this position the swivel lever(s) 59 assumes (assume) the position shown in FIG. 33. If the separating planes 28 (cf. FIG. 32) between adjacent sector members 20a to 20d are to be loosened, the swivel lever(s) 59 only needs (need) to be swivelled—as represented for the right-hand clamping jaw unit 48 in FIG. 33—in arrow direction 61 (cf. the dot-dash position of the swivel lever 59 in FIG. 33). The eccentric bolt 58 thus no longer exerts any force on the inner clamping jaw 102, and the sector members 20a to 20d of the articulated ball 20 are loosened.

After the adjustment of the swivelling levers 59 in arrow direction 61 it is possible to displace or adjust as desired the corresponding arm, rod 26 or similar of the clamping jaw unit 47 and/or 48 as shown by the arrows 62 to 64 in FIG. 34. Thus for the adjusting device connected via the central supporting column 46 to, e.g., the resonator shell of a percussion musical instrument (not shown), desired positional alterations of the arm(s), rod(s) 26 or similar can be achieved by the adjustment of the swivel levers 59 and their eccentric bolts 58, whereby the threaded bolts 51 connecting the inner and outer jaws 102, 103 to one another are used as thrust bearings; in comparison with a hinge connection for example, the threaded bolts 51 have the advantage that a clearance possible because of tolerances can be eliminated during tightening.

What is claimed is:

1. A device for adjusting length and inclination of a support for a percussion musical instrument, said adjusting device comprising:

two articulated balls formed each of a plurality of sector members having wall faces defining a central opening for receiving an adjusting rod-shaped member;

two clamping jaw units formed each of inner and outer clamping jaws provided at respective free ends thereof with housings each of which is formed integrally with a respective one of the inner and outer clamping jaws of a respective clamping jaw unit, with two housings of each clamping jaw unit forming together a socket for receiving and retaining a respective one of the two articulated balls;

a central column for supporting the two clamping jaw units which are arranged symmetrically thereon;

two threaded bolts each for retaining the inner and outer clamping jaws of a respective one of the two clamping jaw units and arranged between a respective articulated ball and the central column adjacent to the respective articulated ball; and means for eccentrically adjusting the clamping jaws of each of the clamping jaw units for releasably securing a respective clamping jaw unit in both length and inclination adjustment positions of the adjusting member;

wherein ones of the inner and outer clamping jaws of the two clamping jaw units are adjustably secured to the central supporting column, and wherein the adjusting device further comprises two supporting members for adjustably securing the ones of the inner and outer clamping jaws directly to the central supporting column, respectively.

2. An adjusting device according to claim 1, wherein the eccentrically adjusting means comprises an eccentric bolt disposed in each of the outer clamping jaws at an end thereof remote from the respective articulated ball and engaging the respective inner clamping jaw, and a swivelling lever provided on the eccentric bolt.

3. An adjusting device according to claim 1, further comprising a plurality of expansion elements arranged in separation planes of adjacent sector members of the articulated balls.

4. An adjusting device according to claim 3, wherein the plurality of expansion elements comprises a plurality of springs.

5. An adjusting device according to claim 3, wherein the central opening has a rectangular cross-section.

6. An adjusting device according to claim 5, wherein the separating planes extend parallel to at least one of wide and narrow sides of a rectangle defining the central opening.

7. An adjusting device according to claim 5, wherein the separating planes extend parallel to a diagonal of a rectangle defining the central opening.

8. An adjusting device according to claim 1, wherein the sector members of the articulated balls have matching shapes.

9. An adjusting device according to claim 1, wherein the plurality of sector members comprises from two to eight sector members.

10. An adjusting device according to claim 1, wherein the central opening has one of circular and polygonal cross-sections.

11. An adjusting device according to claim 10, wherein the central opening has a polygonal cross-section having from three to eight corners.

* * * * *

UNITED STATES PATENT AND TRADEMARK OFFICE
CERTIFICATE OF CORRECTION

PATENT NO. : 5,803,642
DATED : September 8, 1998
INVENTOR(S) : Werner Sassmannshausen It is certified that error appears in the above-identified patent and that said Letters Patent is hereby corrected as shown below:

On the title page, item [73] Assignee, should read:

-- Sonor Johs. Link GmbH, Berleburg, Germany --

Signed and Sealed this

Twenty-sixth Day of January, 1999

Attest:

Attesting Officer

*Acting Commissioner of Patents and Trademarks*